United States Patent [19]

Saki et al.

[11] Patent Number: 4,965,558

[45] Date of Patent: Oct. 23, 1990

[54] METHOD AND APPARATUS FOR IMAGE RETRIEVAL

[75] Inventors: Yosinori Saki; Hiroshi Kotera; Kazuo Unemoto; Tomohiko Arikawa, all of Kanagawa, Japan; Wayne Jung, Skokie, Ill.; Timothy Tutt, Skokie, Ill.; Mike Dunk, Libertyville, Ill.

[73] Assignees: Interand Corporation, Chicago, Ill.; Nippon Telegraph and Telephone Corp., Kanagawa, Japan

[21] Appl. No.: 73,462

[22] Filed: Jul. 15, 1987

[51] Int. Cl.⁵ .............................................. G09G 5/14
[52] U.S. Cl. .................................... 340/712; 340/721; 340/723; 340/724; 364/188
[58] Field of Search ............... 340/706, 707, 708, 711, 340/712, 721, 723, 731, 724; 355/40; 178/19; 364/188

[56] References Cited

U.S. PATENT DOCUMENTS

| | | | |
|---|---|---|---|
| 3,757,037 | 9/1973 | Bialek | 340/712 |
| 4,198,157 | 4/1980 | Johnson | 355/40 |
| 4,586,035 | 4/1986 | Baker et al. | 340/723 |
| 4,587,520 | 5/1986 | Astle | 340/712 |
| 4,601,003 | 7/1986 | Yoneyama et al. | 364/188 |
| 4,603,231 | 7/1986 | Reiffel et al. | 178/19 |
| 4,642,790 | 2/1987 | Minshull et al. | 340/724 |
| 4,649,380 | 3/1987 | Penna | 340/721 |
| 4,670,752 | 6/1987 | Marcoux | 340/724 |
| 4,672,683 | 6/1987 | Matsueda | 340/707 |
| 4,694,288 | 9/1987 | Harada | 340/724 |
| 4,712,191 | 12/1987 | Penna | 340/721 |
| 4,736,199 | 4/1988 | Chadwick et al. | 340/721 |
| 4,780,710 | 10/1988 | Tatsumi | 340/723 |

*Primary Examiner*—Alvin Oberley
*Assistant Examiner*—Richard Hjerpe
*Attorney, Agent, or Firm*—Alan R. Loudermilk

[57] ABSTRACT

An image retrieval system and method are provided for retrieving and displaying images of the plurality of images stored in the system. Images are grouped into collections of images, or documents. Representative images indicative of the representative images include representations of third, orthogonal or depth dimensions indicative of the number of images in the image groups. With a position indicating device, the user selects for display an image from an image group by indicating a position along the depth dimension of the representative image at a location corresponding to the relative location of the image in the image group. The image then is retrieved and displayed. Once the image is displayed, means are provided for sequential retrieval and display of images, forwards or backwards, through the images in the selected image group.

11 Claims, 2 Drawing Sheets

METHOD AND APPARATUS FOR IMAGE RETRIEVAL

BACKGROUND OF THE PATENT

1. Field of the Invention

The present invention relates to an image retrieval system and method by which the image of a desired page is quickly retrieved from a specified document of a multiplicity of voluminous documents stored in a common memory for presentation on a display device.

2. Description of the Prior Art

In a video conference, in which a speaker discusses information with the aid of a displayed image of a page of a document provided on a video display, the overall system performance depends in part upon how quickly a desired page can be located among the myriad of pages and documents in the storage memory and selected for retrieval from the memory. Conventional systems of this kind use, for locating, selecting, and retrieving a desired page of a document, method (A) in which respective documents and pages are numbered and direct access is made to desired numbers and method (B) in which documents and pages are sequentially searched.

Method (A) has limitations in that it is difficult for the user to memorize, or search a list of, all of the names or descriptions of all of the documents and their corresponding page numbers. Method (B) has limitations in that the retrieval time can be relatively long and increases with the number of documents and their pages in memory.

A variety of alternative systems have been proposed for the retrieval of a document and its pages (in video image form), of which, method (C) produces an image frame displaying each page in a reduced size on one video image frame giving a user visual access to a number of pages simultaneously. Method (C) displays the retrieval image frame composed of the reduced size pages, for review and selection by the user. Method (C) is used in the DISCON 1000 Video Image Teleconferencing System manufactured by Interand Corporation, 3200 West Peterson Avenue, Chicago, Ill., 60659.

Method (D) displays one video image retrieval frame composed of a fraction of each page of a document (such as a corner) providing the user with visual reference to many pages of a document simultaneously. The fraction of each page of each document displayed is a function of the total area available for display of the retrieval frame and the total number of images to be displayed in the area.

Both methods (C) and (D) have limitations. Primarily, the memory space required for storing the retrieval frame for each page of each document is large for both methods (C) and (D). Additionally, the number of fractional pages which can be displayed on the retrieval frame, and still be easily read or recognized, is limited since the size of the fractional page images decreases with increasing numbers of pages in the document.

In summary, all of the above noted conventional retrieval methods, (A),(B),(C) and (D), are suitable only for retrieving a desired page from a relatively small number of documents of a few pages, but not for retrieving a specified page from a multiplicity of voluminous documents. In contrast, as discussed below, the present invention overcomes all of the foregoing disadvantages.

SUMMARY OF THE INVENTION

The present invention comprises an improved system for image retrieval such that, a single key image representative of each document (i.e. a reduced image of the front page or a title page representative of the document) and an image dimension representative of the volume of the document (i.e. the number of pages) are displayed simultaneously on a display for each document. The user only needs to select the desired document from the various reduced images of available documents, then select a position in the image dimension representing the approximate location of a desired page in the selected document. The image of the selected page is then displayed and the preceding or succeeding pages are sequentially retrieved.

In preparation for retrieving a specific page from a multiplicity of documents with multiple pages, during a video conference or similar communications meeting, the retriever reviews the key images of each document at least once or has explanation thereon in advance, and hence in many cases the user is aware of the area in the document in which the desired page lies (e.g., the first or second half). Accordingly, the user is able to select the desired document on the basis of the key image and select the approximate location of the desired page of the desired document by means of a pointing device. Sequentially retrieving pages in the general vicinity of the selected page quickly locates the desired page.

Accordingly, the present invention differs from the conventional retrieval methods for finding a desired page by a random access retrieval using the page number. A conventional random access retrieval uses a reduced image or a part of each page and a sequential retrieval on a page by page or document by document basis. Whereas the present invention uses a reduced image of each document, and enables selection of a specific document and subsequently the desired page in that document to be roughly specified by a pointing means.

A principal object of this invention is to provide an image retrieval system and method that allows the user to quickly and intuitively retrieve a desired page from a multiplicity of voluminous documents.

Another object of the present invention is to minimize the size of the memory required to perform the quick and intuitive retrieval of documents from the document storage system.

It is another object of the present invention to provide the user with an easily read or recognized key image of each document by which the user will quickly recognize the document.

These and other objects and advantages of the present invention are presented, by way of illustration and not limitation, by the following detailed description of a preferred embodiment of the present invention.

DETAILED DESCRIPTION OF THE PREFERRED EMBODIMENT

For this detailed description of the preferred embodiment of the present invention the following terms will be defined as:

page - a single electronic leaf of a document composed of text or images or both, such as in a book, letter, manuscript or other document either in physical copy, computer generated form, or other electronic form, such leaf being constrained only by the limits of the electronic storage medium and not the physical dimension of the specimen leaf, document - a compilation of pages forming a collection of information, document group - an assemblage of documents identified by specified common characteristics.

Figure 1A:
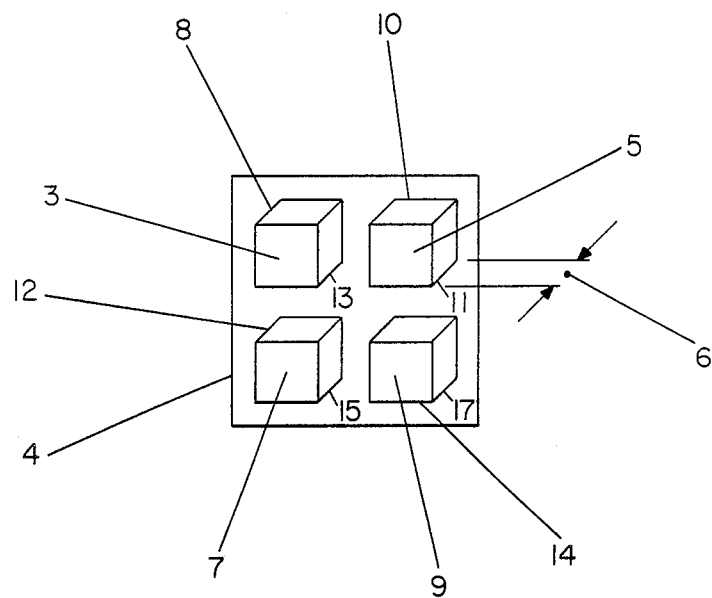
FIGS. 1A and 1B illustrate the principle of the retrieval method of the preferred embodiment of the present invention.
Figure 1B:
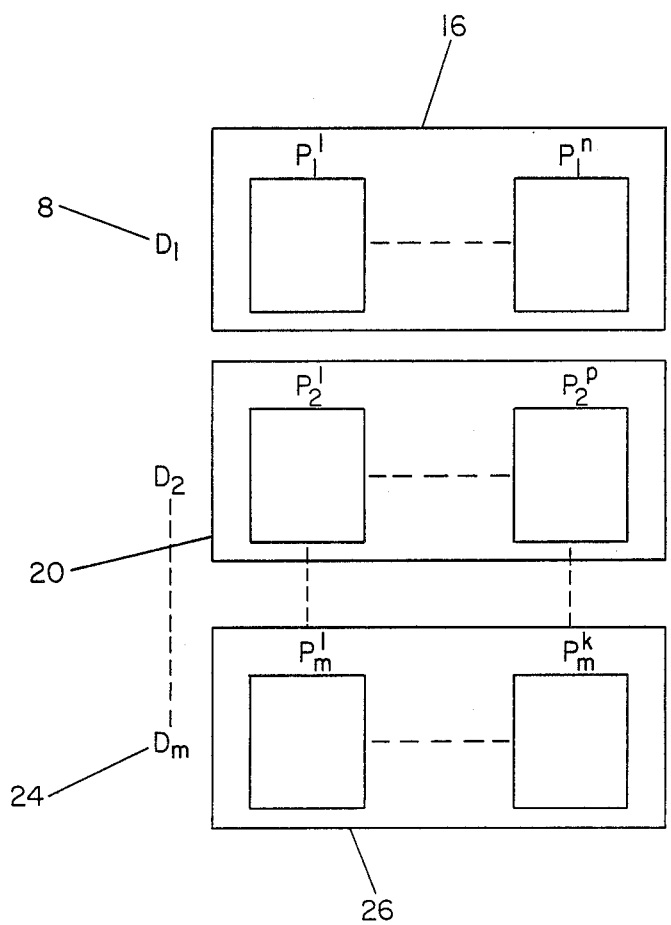

FIGS. 1A and 1B illustrate the principle of the retrieval method of the preferred embodiment of the present invention. FIG. 1A and FIG. 1B show documents $D_1$, $D_2$ to $D_m$ 8, 10, 24, respectfully, of document group 4 wherein document $D_1$ 8 consists of pages $P_1^1$ to $P_1^n$ 16, document $D_2$ 10 consists of pages $P_2^1$ to $P_2^p$ 20 and document $D_m$ 24 consists of pages $P_m^1$ to $P_m^k$ 26. Document group 4 in FIGS. 1A and 2A by way of illustration contain four documents, but, as illustrated in FIG. 1B, document group 4 is not limited to contain four documents, and may contain fewer or more than four documents.

In the preferred embodiment of the present invention, illustrative document group 4 is shown to concurrently display the multiplicity of documents $D_1$, $D_2$, $D_3$, and $D_4$ 8, 10, 12, 14. Each of the documents include a key image 3, 5, 7, 9, respectively, identifying the documents 8, 10, 12, 14, respectively of the document group. For example, the key image 3 of the front cover identifies document D1 8 and the image dimension 13 indicates the volume (i.e. the number of pages) of document D1 8. The image dimensions 13, 11, 15, 17, respectively, are proportional to the number of pages of each document D1, D2, D3, D4 8, 10, 12, 14, in the document group image retrieval frame 4. The image dimension measurement 6 illustrates the measurement of the image dimension 11, 13, 15, 17. The image dimension measurement 6 is measured from the key image 3, 5, 7, and 9 of each document to the last page of the respective document.

Figure 2A:
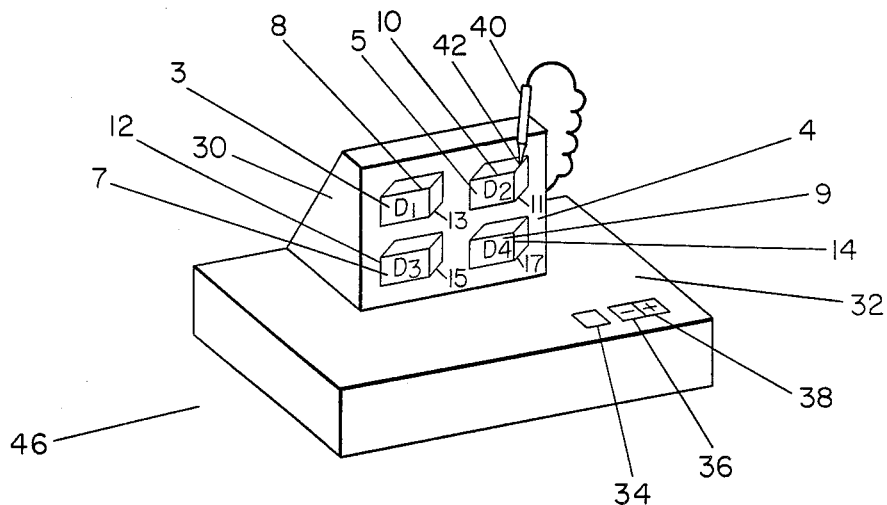
FIGS. 2A, 2B and 2C illustrate examples of display images during image retrieval by the present invention.
Figure 2B:
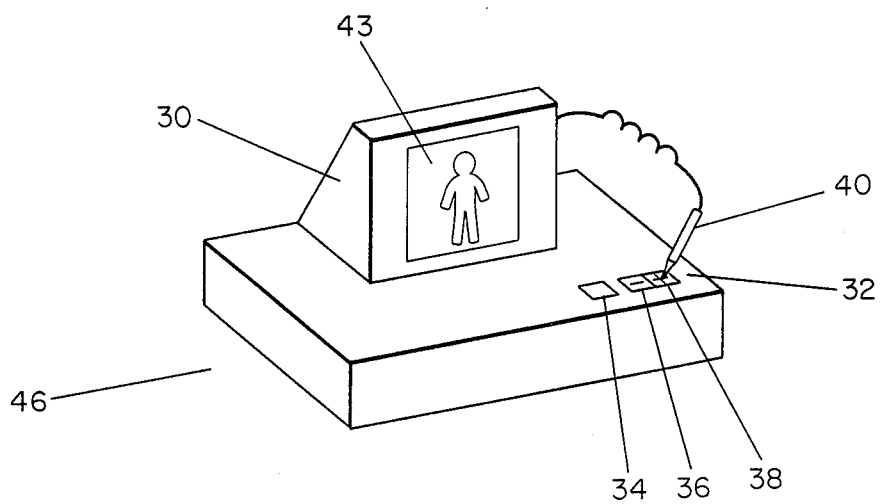
Figure 2C:
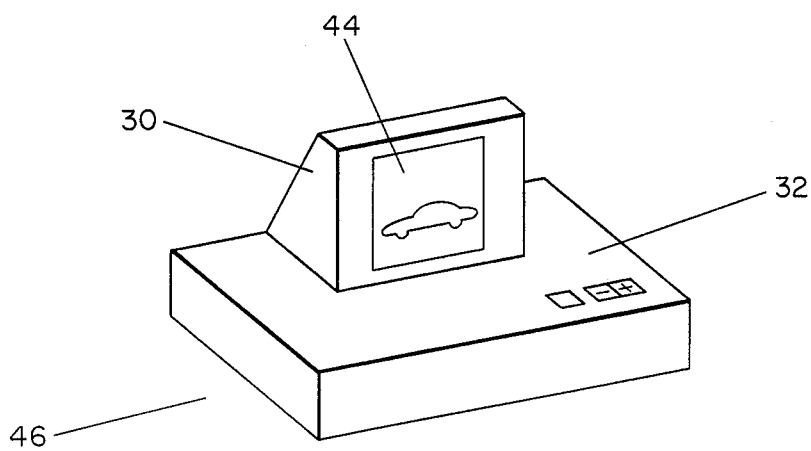

FIGS. 2A, 2B and 2C illustrate the principles presented in FIGS. 1A and 1B using an image retrieval and storage system 46. The image retrieval and storage system 46 used in the preferred embodiment of the present invention is any of the DISCON family of video teleconferencing systems which include the ImageFile video image storage and retrieval system which are manufactured by Interand Corporation, 3200 West Peterson Avenue, Chicago, Ill., 60659. Additionally, the DISCON family of video teleconferencing systems incorporate the system for sensing spatial coordinates presented in U.S. Pat. No. 4,603,231; Reiffel et al., which is hereby incorporated by reference. Examples of images of documents 8, 10, 12, 14 displayed on the display device 30 are shown to clarify the image retrieval method of the preferred embodiment of the present invention.

An image retrieval device 46 has a display device 30 mounted on the device body 32. A desired document, for this example document D2 10, can be selected by touching the display screen of the display device 30 with point selecting means 40 at approximately the location 42 of the desired page within the document 10. The body 32 has controls 36, 38 for sequential updating the pages of, in this example, document D2 10.

The document group 4, composed of the reduced image 3, 5, 7, 9, respectively, of the front cover of each document 8, 10, 12, 14, respectively, and the image dimension 11, 13, 15, 17, respectively, indicating the volume of each document 8, 10, 12, 14, respectively, is displayed on the display device 30 as shown in FIG. 2A. Typically, the image of the front cover of each document is an image composed of lettering or other distinct visual characteristics which are recognizable to the user for determining which document contains the desired page. When the desired document is not contained in the document retrieval image frame, another document retrieval image frame is displayed by operating the image frame updating control 34. Use of the updating control displays the next document group 4 from the sequence of available document groups.

Once the desired document is located, the user controls the pointing device 40 to select the image 10 at a position 42 along the image dimension where the desired page is expected to reside. Then the page 43, thus selected, is displayed on the display 30 as depicted in FIG. 2B. Next, the user operates the sequential retrieval controls 36, 38 to sequentially page through the images starting at the specified page, until the desired page 44 is displayed as shown in FIG. 2C.

As will be appreciated from the above discussion, according to the retrieval method of the present invention, the neighborhood of the desired page can be found in substantially less time than with conventional retrieval methods. Accordingly, the desired page can be found in a short time by using the method of the present invention in combination with the sequential retrieval method. Furthermore, preprocessing for retrieval, such as the preparation of retrieval image frames, is also simplified.

The number of reduced images which are displayed in one document group 8 which serves as the image retrieval selection frame as illustrated in FIGS. 1A and 2A, frame is not limited specifically to four documents alternatively one frame may be used, for example, for the reduced image of only one document. In this case, the retrieved image frame carrying the desired document group is retrieved and then the desired page is retrieved using the point selecting device so that the retrieval can be completed in a short time period.

As described above, according to the retrieval method of the present invention, when the user has reasonable ability to quickly identify a document, the front cover (i.e. an image identifying a document), and the appropriate location where the desired page is contained within the selected document, the user can retrieve the desired page much more quickly. The retrieval method described above is analogous to searching a book shelf for a books, selecting a specific book, and then paging through the book to find the required page. Accordingly, the present invention is of great utility when used in a video conference or similar situation which utilizes document groups, documents, and specific pages stored in a memory.

Although the invention has been described in terms of a preferred embodiment, it will be obvious to those skilled in the art that many alterations and modifications may be made with out departing from the invention. Accordingly, it is intended that all such alterations and modifications be included within the spirit and scope of the invention as defined by the appended claims.

What is claimed is:

1. In an image storage and retrieval system having an image storage means, an image display means and a position indicating means, wherein the image storage means has stored therein one or more image groups, wherein one or more of the image groups contains a plurality of images, a method for retrieving an image comprising the steps of:

displaying on the display means representative images indicative of the images contained in the image groups, wherein each representative image further provides a representation of a third, orthogonal dimension that corresponds to one of the stored image groups wherein the magnitudes of the third, orthogonal dimensions are proportional to the number of images in the respective corresponding image groups;

indicating a position along one of the representations of the third, orthogonal dimensions with the position indicating means; and, retrieving an image from the storage means wherein the retrieved image is dependent upon the position indicated by the position indicating means.

2. The method as claimed in claim 1 further comprising the step of displaying the retrieved image on the display means.

3. The method as claimed in claim 2 further comprising the step of sequentially retrieving from the storage means and displaying on the display means the images in the image groups.

4. The method as claimed in claim 3 wherein the step of sequentially retrieving from the storage means and displaying on the display means the images in the image groups is controlled by the position indicating means.

5. The method as claimed in claim 1 or 2 wherein each of the representative images is a reduced image of an image in the respective image group.

6. The method as claimed in claim 1 or 2 wherein each of the representative images is a portion of an image in the respective image group.

7. A system for storing and retrieving images comprising:

image storage means for storing one or more image groups, wherein one of more of the image groups contains a plurality of images;

display means for displaying representative images indicative of the images contained in the image groups and for displaying images that are retrieved from the image storage means, wherein each representative image further provides a representation of a third, orthogonal dimension that corresponds to one of the stored image groups, wherein the magnitudes of the third, orthogonal dimensions are proportional to the number of images in the respective corresponding image groups; and position indicating means for indicating positions along the representations of the third, orthogonal dimensions, wherein the display means is responsive to the position indicating means such that the image displayed on the display means is dependent upon the position indicated by the position indicating means.

8. The system as claimed in claim 7 further comprising means for sequentially retrieving from the storage means and displaying on the display means images in the image groups.

9. The system as claimed in claim 8 wherein the means for sequentially retrieving from the storage means and displaying on the display means images in the image groups is responsive to the position indicating means.

10. The system as claimed in claim 7 or 8 wherein each of the representative images is a reduced image of an image in the respective image group.

11. The system as claimed in claim 7 or 8 wherein each of the representative images is a portion of an image in the respective image group.

* * * * *